United States Patent Office 3,445,055
Patented May 20, 1969

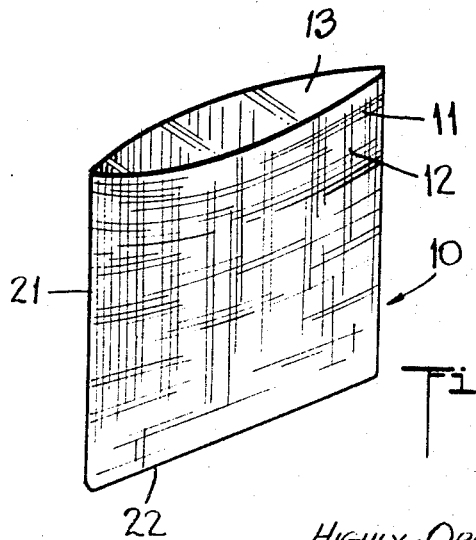
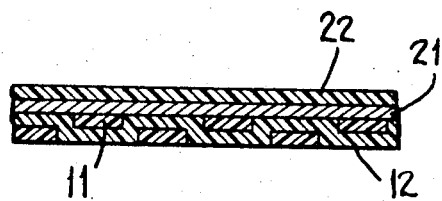
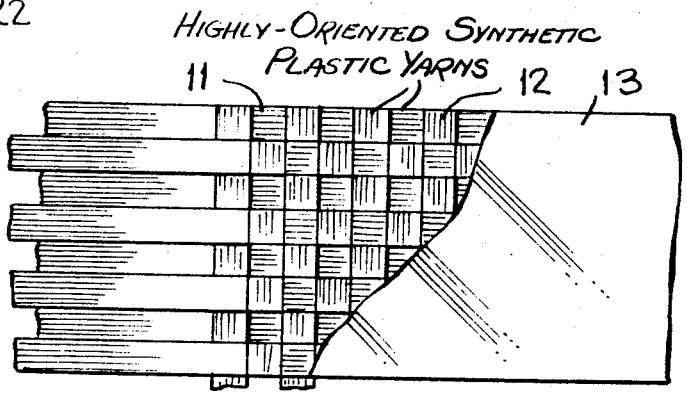
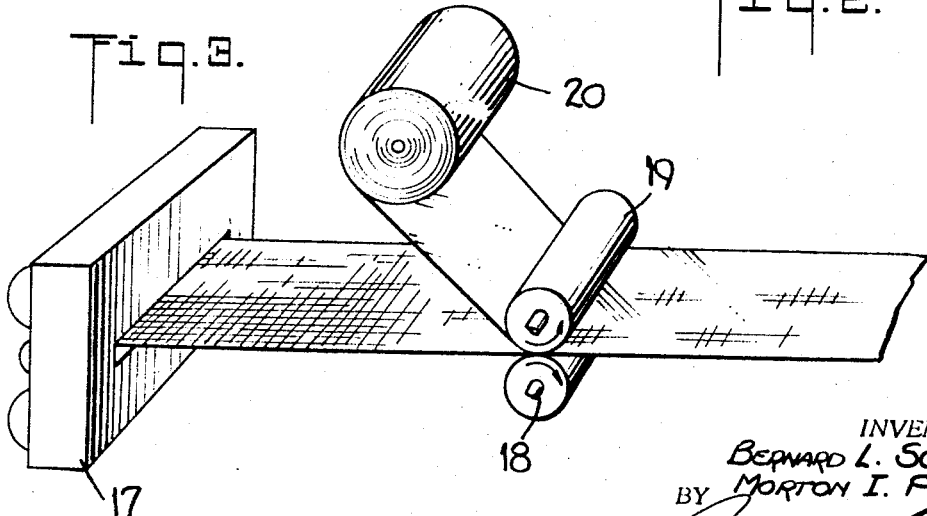

3,445,055
REINFORCED LAMINATED PLASTIC MATERIALS
Morton I. Port, West End, N.J., and Bernard L. Schwartz,
Scarsdale, N.Y., assignors to Parker, Pace Corporation,
New York, N.Y., a corporation of New York
Continuation-in-part of application Ser. No. 419,140,
Dec. 17, 1964. This application Apr. 28, 1966, Ser.
No. 545,926
Int. Cl. B65d 31/02
U.S. Cl. 229—53                                   11 Claims This invention relates generally to plastic bagging and bags, and in particular to bagging and bags formed of a fabric constituted by interwoven synthetic plastic, ribbon-like yarns laminated to a plastic film to provide a reinforced material of exceptional strength which is light-weight and dimensionally stable. This application is a continuation-in-part of our copending application Ser. No. 419,140, filed Dec. 17, 1964.

In the packaging of chemical powders, grain, tobacco, raw wool, cotton, and other bulk materials, one must use heavy-duty bags or sacks having adequate strength for the intended load and affording protective cover therefor. While standard commercial bags for such purposes, which are made of multi-walled paper or woven natural fibers of cotton or jute, have the requisite strength when in the dry state, should the bag become wet in use, the resultant loss in strength may cause failure of the bag. Moreover, bags of conventional design are subject to rot, mildew and attack by insects.

It is also known to fabricate bags of extruded plastic film material, such as polyethylene. These bags are generally immune to deterioration, but they are lacking in other important qualities, for plastic film has limited strength and tends to stretch or distort under heavy loads. Moreover, bags made of plastic film have poor tear resistance and they are difficult to stack, for the smooth film surface causes slippage.

Plastic film has a relatively unfavorable strength-to-weight ratio, and while the strength of a bag made of plastic film may be enhanced by using film in heavier gauges, this results in a marked increase in cost which puts the bag at a competitive disadvantage with respect to bags made of natural materials.

Accordingly, it is the main object of this invention to provide bagging and bags formed of a fabric woven of flat, synthetic plastic yarns, the fabric being laminated to a thin plastic film to produce a reinforced, light-weight material having exceptional tensile and tear strength, as well as dimensional stability in all directions, including the diagonal.

More specifically, it is an object of the invention to provide a reinforced plastic bag of the above-described type wherein the flat, synthetic plastic yarns in the fabric are oriented and drawn to high tensile strength, the fabric forming the exterirnor wall of the bag and having a rough surface, with the film laminated thereto forming an inner wall having a smooth surface, whereby the bags may be stacked without slippage.

Another object of the invention is to provide a bag of the above-noted type which is waterproof but gas permeable to permit the passage of gas and vapors, which exhalations prevent mildew of certain bulk materials.

Yet another object of the invention is to provide a bag whose laminating film is coated or metallized to render the bag completely impervious to water, gas and vapor as well as thermally reflective, whereby the contents thereof are hermetically sealed and protected against heat rays.

Still another object of the invention is to provide a reinforced plastic bag of the above type, which may be manufactured and sold at relatively low cost.

Briefly stated, these objects are accomplished in a bag formed of reinforced material constituted by a plastic fabric laminated to a plastic film, the fabric being on the exterior of the bag and being composed of synthetic plastic yarns which are of flat monofilament construction longitudinally oriented to maximize their tensile strength, the yarns being bonded to the film which preferably lies on the interior of the bag and which imparts a high degree of tear resistance as well as dimensional stability to the material.

For a better understanding of the invention, as well as other objects and further features thereof, reference is had to the following detailed description to be read in conjunction with the accompanying drawing, wherein:

FIG. 1 is a perspective view of a bag made of reinforced material in accordance with the invention;

FIG. 2 is a plan view of the reinforced bagging material;

FIG. 3 schematically shows a preferred technique for fabricating the reinforced material; and FIG. 4 shows in section another embodiment of a bagging material in accordance with the invention and adapted to form a hermetically sealed bag.

Referring now to FIG. 1, the bag or sack, generally designated by numeral 10, is formed by a fabric composed of warp yarns 11 and weft or filler yarns 12, the yarns being laminated to a plastic film 13 which forms the interior wall of the bag, the exposed surface of the fabric being the outer wall thereof.

The yarns composing the fabric are ribbon-like synthetic monofilament plastic yarns manufactured in various densities and having a generally rectangular cross-section. The warp and weft yarns are tightly woven on a textile loom to form a sheet-like fabric relatively free of interstices. Such yarns may be produced from any suitable synthetic plastic material, including polypropylene, polyamides, such as nylon, polyester or polyacrylic yarns, as well as vinyl and polyethylene. In practice, yarns of 1 to 2 mils in thickness and 50 to 200 mils in width, are suitable. Useable weaves for purposes of the invention lie in the range of 12 x 12 and lower, and in practice a weave of 3 x 3 is satisfactory.

It will be appreciated that by reason of the flat yarns forming the fabric, maximum coverage is obtained with the least amount of weaving and the least amount of material in terms of weight, for as compared to round yarns, flat yarns require relatively few yarns per inch to cover a given surface.

It is important that the ribbon-like yarns be highly-oriented mono-axially in the longitudinal direction to the point where it has a very low residual elongation. This may be accomplished by using standard techniques to so draw the flat yarn or the web from which the flat yarns are slit as to irreversibly stretch the yarn or web, thereby orienting the molecular structure of the material. Film 13, on the other hand, may be non-oriented, or more or less bi-axially oriented, in which event the material is drawn both in the transverse and longitudinal directions.

The thickness of film 13 is preferably in the range of one-half to 2 mils, and it may be made of the same synthetic plastic material as that constituting the yarns of the fabric. The film, however, may be made of or coated with a material having a lower melting point than that of the fabric, to facilitate lamination thereto by heat and pressure. The film is of uniform thickness and has a smooth surface which may readily be cleaned if the bag is to be reused.

When the mono-axially oriented synthetic yarns are interwoven, they cross over in the warp and woof directions, and if the disposition of these yarns is maintained under stress or tearing forces, the fabric will have exceptionally high tear and tensile strength. The film laminated to the yarns serves to maintain their positions and to prevent shifting thereof, so that the resultant material is not only unusually strong for its weight, but is dimensionally stable. It is also possible to use non-woven fabric with the warp yarns lying over the filling yarns, and relying on the film to maintain the desired relationship of the yarns.

Since the fabric yarns have a very low residual elongation and the film, which is either non-oriented or oriented to a point having greater residual elongation than the yarns, when the bagging material is subjected to great stress, the film will tend to stretch whereas the yarns will tend to bunch, and in the bunched form will offer tremendous resistance to tearing forces.

In bags made of unoriented film, the strength-to-weight ratio is poor, in the order of 3200 to 5700 p.s.i., whereas in bags made with oriented film, it is in the order of 21,000 to 30,000 p.s.i. But with the reinforced plastic fabric in accordance with the invention, the values run as high as 60,000 p.s.i., the strength being in both directions because of the weave.

It has been found, for example, that a reinforced material formed of a fabric having flat yarns 1½ mil in thickness, the fabric having a width of 100 mils and in an 8 x 8 weave construction, the fabric being laminated to a film of polypropylene 1 mil in thickness, has a combined weight of 2.5 ounces per square yard, and that this reinforced material has a strength comparable to that obtainable with non-oriented film of 31.0 mils in thickness having a weight of 26.8 ounces per square yard, or to that obtainable with bi-axially oriented film of 5.0 mil thickness having a weight of 4.18 ounces per square yard. Thus strengths are obtained by the reinforced material equivalent to those obtained with material of the same composition but of much greater thickness and weight.

Moreover, not only does the reinforced material provide exceptional strength at greatly reduced weight and hence at much less cost, but when the smooth film is on the inside of the bag and the relatively rough-surfaced fabric is on the outside, the bags can be readily stacked, the fabric surface resisting slippage. The bag is capable, therefore, of supporting unusually heavy loads without sagging or stretching of the bag material.

In some instances, as with organic bulk materials such as grain and tobacco, one must avoid hermetically sealing the contents, and while the bag should be waterproof to prevent wetting of the contents, it nevertheless must allow for a limited flow of air or vapor. In the plastic fabric, though the weave is close, there nevertheless remain minute pores at the points of intersection of the warp and filler yarns. Because of surface tension effects, water cannot pass through these pores, but they nevertheless permit the passage of gas and vapors, which exhalations prevent mildew of certain bulk materials, and other deleterious effects. However, the film is normally impervious, and where it is desired to render the bag waterproof but vapor-permeable, the film before lamination to the fabric is conveyed through perforating rolls or is otherwise foraminated to provide minute pores therein.

In forming the reinforced material, as shown in FIG. 3, the fabric 16 is made in a standard loom 17, the fabric emerging from the loom entering a pair of heated rolls 18 and 19 in combination with a web of film material 20, the rolls applying heat and pressure to effect lamination. In practice, the rolls may be at a temperature of 300° F. to 320° F. However, the appropriate temperature will depend on the physical nature of the synthetic plastic used. Lamination may also be effected by using infra-red or dielectric heating systems. Additionally, lamination may be carried out by extrusion coating.

In some instances, where it is desirable to render the bag more completely impervious to water, gas and moisture than when using films such as polyethylene, one may coat this film with Saran or material having comparable barrier characteristics. In such bags, the seams should be heat sealed or otherwise processed so that the contents thereof are then hermetically packaged.

It is lso possible to increase the resistance of the bag to bursting pressures as well as to render the bag completely impervious to gas and vapors. This is accomplished by the use of a laminated film in the form of a liner, as shown in FIG .4, formed of metal foil 21 such as aluminum foil, bonded to a layer 22 of polyethylene, Saran or other suitable plastic film, the metallic side being bonded by adhesive to the woven fabric formed by yarns 11 and 12. In lieu of adhesive for bonding the foil side of the liner to the fabric, the foil may be coated with a suitable thermoplastic material to facilitate lamination without adhesive, by heat and pressure.

The metallized liner 21 or 22 may be creped, waffled or otherwise embossed to increase its resistance to bursting pressures created when the fabric exterior thereto is strained to the point of elongation or bursting. The metal layer also serves to reflect radiation and thereby protect the contents against heat.

In shaping the fabric into a sack, it is only necessary to cut a suitable rectangle of the material and fold it into a cylinder, after which the longitudinal end 21, as shown in FIG. 1, is seamed, and the short end 22 is seamed and possibly reinforced by a marginal fold-over to close in the bottom of the sack. To facilitate printing of the plastic bagging material, it is first subjected to a corona discharge to enhance the adhesion of printing inks thereto.

We claim:

1. A dimensionally stable, heavy duty, waterproof bag of high strength; said bag having an open end and a closed end and being formed of a reinforced material constituted by:
   (a) a sheet-like fabric formed of woven warp and filling yarns which are of flat, monofilament synthetic plastic material mono-axially oriented to the point of very low residual elongation in the longitudinal direction to obtain maximum coverage for the least amount of material in terms of weight as well as optimum tensile strength, and
   (b) a film formed at least in part of a layer of synthetic plastic material having greater elongation properties than said yarns and laminated to said fabric to reinforce same, said fabric being on the exterior of the bag to afford resistance against slippage.

2. A bag, as set forth in claim 1, wherein said film includes a layer of metal foil laminated to the plastic layer.

3. A bag, as set forth in claim 2, wherein the foil layer is embossed to increase the bursting resistance of the bag.

4. A bag, as set forth in claim 3, wherein said foil layer is aluminum.

5. A bag, as set forth in claim 1, wherein said film is coated with Saran to provide a hermetically sealed bag.

6. A bag, as set forth in claim 1, wherein said film is foraminated to render it pervious to gas and vapor.

7. A material as set forth in claim 1, wherein said yarns and said film are of polypropylene.

8. A material as set forth in claim 1, wherein said yarns and said film are formed of polyethylene.

9. A material as set forth in claim 1, wherein said yarns have a thickness of 1 to 3 mils.

10. A material as set forth in claim 1, wherein said laminated film has a thickness of one-half to 3 mils.

11. A material as set forth in claim 1, wherein said film is bi-axially oriented.

References Cited

UNITED STATES PATENTS

| | | | |
|---|---|---|---|
| 3,297,509 | 1/1967 | Mercer | 156—271 |
| 3,270,370 | 9/1966 | Mercer | 18—12 |
| 3,270,103 | 8/1966 | Kurtz | 264—45 |
| 3,255,065 | 6/1966 | Wyckoff | 156—229 |
| 3,266,966 | 8/1966 | Patchell | 156—167 |
| 2,752,276 | 6/1956 | Woock | 161—109 |
| 2,545,981 | 3/1951 | Warp | 161—143 |
| 2,332,373 | 10/1943 | Dorogh et al. | |

ROBERT F. BURNETT, *Primary Examiner.*

M. A. LITMAN, *Assistant Examiner.*

U.S. Cl. X.R.

99—171, 174; 139—389; 161—71, 89, 92, 402